No. 897,833. PATENTED SEPT. 1, 1908.
H. C. HUBBELL.
REVERSIBLE GALVANIC BATTERY.
APPLICATION FILED JUNE 2, 1906.

Witnesses:
Jos. H. Blackwood
W. O. Blackwood

Inventor.
Harry C. Hubbell
by Jas. L. Skidmore
his Atty.

UNITED STATES PATENT OFFICE.

HARRY C. HUBBELL, OF ORANGE, NEW JERSEY, ASSIGNOR TO PORTABLE ELECTRIC SAFETY LIGHT COMPANY, OF NEWARK, NEW JERSEY, A CORPORATION OF NEW JERSEY.

REVERSIBLE GALVANIC BATTERY.

No. 897,833.     Specification of Letters Patent.     Patented Sept. 1, 1908.

Application filed June 2, 1906. Serial No. 319,901.

*To all whom it may concern:*

Be it known that I, HARRY C. HUBBELL, a citizen of the United States, residing at Orange, in the county of Essex and State of New Jersey, have invented certain new and useful Improvements in Reversible Galvanic Batteries, of which the following is a specification.

This invention relates to galvanic batteries designed more particularly for portable electric purposes, such as lamps for the use of miners, watchmen, and in places where an electric battery lamp is desirable.

One of the principal objects of my invention is to provide a practically permanent battery of very low internal resistance, light in weight, small in bulk, but comparatively large in watt capacity.

It is very desirable for such portable lamps to reduce the weight and bulk of the battery as much as possible, for obvious reasons, and it has been the object of this invention to accomplish these desirable objects and at the same time to increase the permanency and efficiency of the battery and to reduce the cost in running the lamps.

Another object of my invention is to provide battery elements of great conductivity and capacity, which will be practically permanent, which will not disintegrate in the electrolyte, owing to their protecting envelops, and which will be light in weight and of small bulk. I have also employed a novel method in producing the active elements and securing them to a supporting plate.

The foregoing objects and advantages are attained by means of the construction shown in the accompanying drawing, when taken in connection with the process and materials employed.

Figure 1:
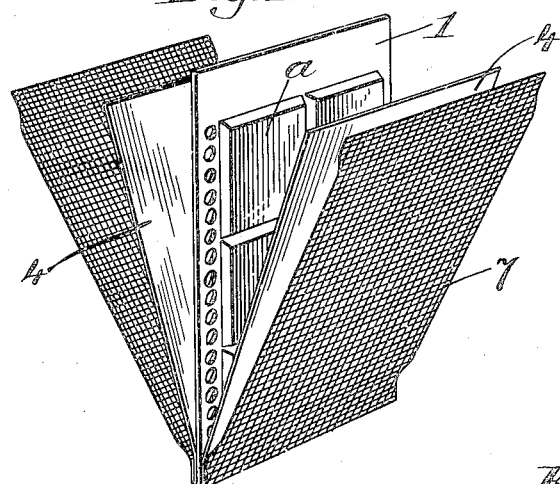
Figure 2:
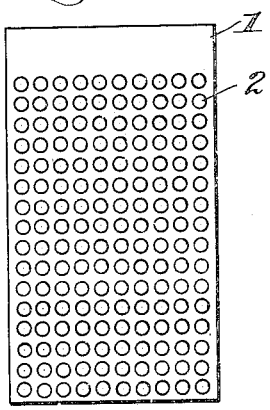
Figure 3:
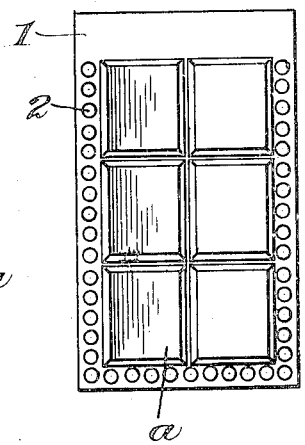
Figure 5:
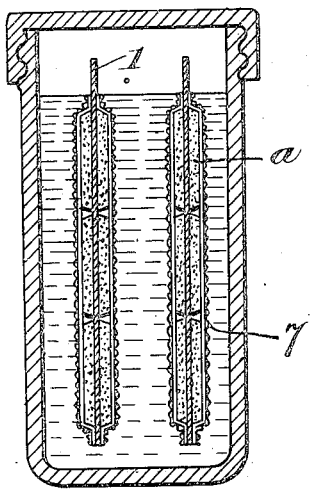
Figure 4:

In the accompanying drawing:—Figure 1 is a perspective view illustrating the various parts of the cathode separated to better show the general arrangement of layers; Fig. 2 is a plan view of the perforated supporting plate; Fig. 3 is a similar view of the supporting plate with the active materials secured thereto; Fig. 4 is a transverse section of the cathode incased in a wire gauze pocket or cover, and Fig. 5 is a sectional view of the battery complete.

Referring to the drawing for a more particular description of the means employed in carrying out my invention, the numeral 1 designates the supporting plate, preferably formed of nickel plated iron and provided with perforations 2 of the required size for my purpose. Instead of the perforated plate I may use an open wire work foundation, but the perforated sheet metal plate has been found preferable for my purpose.

The active material of the positive plate is formed of nickel hydrate, $Ni(OH)_2$ and silver oxid ($Ag_2O$), both of which materials are first reduced to an impalpable powder and intimately commingled. I have found the best results are attained by using not more than 60 per cent. nickel hydrate and 40 per cent. silver oxid. This mixture is then submitted to great pressure to form a tablet of the required size and shape, or the pulverized oxids may be pressed upon opposite sides of the supporting plate 1, thus forming a compact mass which anchors through the perforations in said plate 1. It is to be understood that the mixture is compressed in the dry state.

In a reversible galvanic battery, suitable for portable purposes, the well known activity of an oxygen storing electrode of pure silver in a porous or finely divided condition, makes it particularly desirable, but the cost is prohibitive for general use. I have found that an oxygen storing electrode may be made of a mixture of silver oxid and nickel hydrate, with as much as sixty per cent. of nickel hydrate, without the use of any other conducting material in the mixture. An electrode made of such a mixture in the proper way will be practically as active per unit of mass as one of pure silver oxid.

The tendency of the silver oxid to be displaced by the actions of charging and discharging has been found to be overcome by the use of the protecting envelop such as described below. It will be understood that I propose to use an accumulator employing an alkaline electrolyte, and active materials for electrodes insoluble in the solution, which may be an aqueous solution of sodium or potassium hydrate.

The dry-pressed tablet prepared as described may be placed in an envelop 4 of asbestos filter paper, and then the whole is covered by a wire cloth pocket 7, the edges of which are brought together and secured by metal binding strips 8. These binding strips are bent to form a groove which fits over the edges of the wire gauze pocket, and are pinched to hold the parts in place. These strips may be of nickel or nickel plated iron or soft steel.

The negative plate, which is oxidized on discharge, comprises similar dry-pressed tablets of mixed cadmium oxid and impalpably powdered metallic nickel, and I have found that equal parts of each when finely powdered, thoroughly mixed, and submitted to very heavy pressure, form an electrode having excellent qualities. As cadmium oxid is distinctly soluble in the solution, the repeated and continued electro deposition of this metallic cadmium, while the battery is being charged and discharged, tends to spoil the porosity of the plate, were it not for the presence of the powdered metallic nickel, which forms a slight galvanic couple with the metallic cadmium and keeps the porosity of the plate permanent. Furthermore, the cadmium oxid being a rather poor conductor, and as there is cadmium oxid formed immediately on the discharge of the battery, the metallic nickel present maintains in considerable measure the conductivity of the mass of the material throughout the operation. This electrode is also inclosed in a wire gauze pocket envelop in an asbestos paper filter, in substantially the same manner as the cathode element.

For use in portable lamps of the character referred to, wherein reduction in weight and bulk are of considerable importance, when taken in connection with durability and efficiency, I have found that the materials employed in the proportions mentioned, and treated as described, give the very best results. However, slight changes in proportion and treatment may be made without departing from the spirit and scope of the invention.

Having thus described my invention, what I desire to secure by Letters Patent and claim is:—

1. A plate for reversible batteries, comprising a dry-pressed tablet of powdered nickel hydrate and powdered oxid of silver.

2. In a reversible galvanic battery, a plate comprising one or more dry-pressed tablets of powdered nickel hydrate and powdered oxid of silver, a plate comprising one or more dry-pressed tablets of cadmium oxid and nickel hydrate, and a suitable electrolyte.

HARRY C. HUBBELL.

In presence of—
JOSEPH P. SCANNELL,
DUNCAN T. MCLAREN.